United States Patent [19]

Schipfer et al.

[11] Patent Number: 5,618,893
[45] Date of Patent: Apr. 8, 1997

[54] PROCESS FOR THE PREPARATION OF CATIONIC BINDERS FOR COATINGS, THE BINDERS PRODUCED, AND THEIR USE

[75] Inventors: Rudolf Schipfer; Gerhard Schmölzer, both of Graz, Austria

[73] Assignee: Vianova Kunstharz, AG, Werndorf, Austria

[21] Appl. No.: 673,690

[22] Filed: Mar. 22, 1991

[30] Foreign Application Priority Data

Mar. 22, 1990 [AT] Austria ........................... 674/90

[51] Int. Cl.$^6$ ................................................. C08F 283/00
[52] U.S. Cl. ............................................. 525/526; 525/927
[58] Field of Search ............................... 525/526, 927

[56] References Cited

U.S. PATENT DOCUMENTS

| | | | |
|---|---|---|---|
| 3,876,618 | 4/1975 | Clarke | 525/534 |
| 4,686,249 | 8/1987 | Diefenbach et al. | 523/410 |
| 4,786,693 | 11/1988 | Hefner, Jr. | 525/528 |
| 4,992,516 | 2/1991 | Schipfer et al. | 525/526 |

*Primary Examiner*—John C. Bleutge
*Assistant Examiner*—Randy Gulakowski
*Attorney, Agent, or Firm*—Breiner & Breiner

[57] ABSTRACT

Binders for cathodic electrodeposition coatings based on epoxy resin-amine adducts are obtained by incorporation of oxazolidone structures in combination with diamine bridges built up in a specific manner. The modified epoxy resin-amine adducts are used in electro-dipping coatings together with crosslinking components. The stoved coating films have excellent corrosion protection, especially at the edges of workpieces.

9 Claims, No Drawings

PROCESS FOR THE PREPARATION OF CATIONIC BINDERS FOR COATINGS, THE BINDERS PRODUCED, AND THEIR USE

FIELD OF INVENTION

This invention relates to a process for the preparation of cationic binders for coatings based on modified epoxy resin-amine adducts; to the binders prepared by such process, and use of the binders in combination with crosslinking components in cathodic electrodeposition coatings.

BACKGROUND OF INVENTION

Stringent requirements are imposed on binders for electrodeposition coatings. Not only is it necessary to prepare the electrodeposition bath and the ultimate electro-deposited coating without difficulty, but a very high profile of properties is also required in the binder such as throwing power during the electrodeposition and surface characteristics of the films produced, including corrosion resistance and stone-chip resistance in connection with good adhesion to the substrate being coated and to subsequent coats of paint. To achieve favorable dilution properties of the coatings in an electro-dipping plant, the binders should have a low viscosity. On the other hand, a high molecular weight is one of the preconditions for achieving good resistance properties in the final crosslinked films, which is usually associated with a high viscosity of the binder. Similar contradictory requirements exist in respect to the development of a high electrical film resistance during deposition in order to achieve a good throwing power, and the simultaneous desire for a high film thickness with excellent surface quality.

A compromise between an optimum in deposition characteristics and the properties of the crosslinked coating films is obtained in different ways by different types of modification of bisphenol A-epoxy resin-amine adducts or phenol novolak-epoxy resin-amine adducts as disclosed in the literature. Thus, EP-A2-0,355,654, corresponding to U.S. Pat. No. 4,992,516, describes a high molecular weight structural unit which contains oxirane functional groups and has a low glass transition temperature, with a polyhydroxy-diamine as a modifier, which enables the properties such as solubility properties, throwing power, layer build-up, and film flow to be optimized. It is also known that products carrying urethane or urea groups such as described in EP-A2-0,218,812, corresponding to U.S. Pat. No. 4,845,171, or in EP-B1-0, 209,857, corresponding to U.S. Pat. No. 4,711,934, produce particularly good results in respect to their corrosion protective properties. The incorporation of these urethane or urea groups in general has the effect of increasing the glass transition temperatures of the binders. However, the consequence of this is a deterioration in the film flow and a reduction in the maximum layer thicknesses which can be achieved. To achieve high film layers and excellent surface qualities, modifications must be made to such binder systems to render the polymer structure flexible, which in most cases again causes a reduction in the resistance properties of the stoved films, especially at the edges of the workpieces, and a reduction in the adhesion of subsequent coats. The positive properties of these binders, that is to say their excellent corrosion resistance and stone-chip resistance in connection with the good adhesion to subsequent coats, can therefore only be partly utilized.

Many methods for plasticizing primers which can be deposited cathodically are known from the literature as disclosed, for example, in Austrian Pat. No. 381,115, corresponding to U.S. Pat. No. 4,659,800; U.S. Pat. No. 4,104, 147, and EP-A2-074,634, corresponding to U.S. Pat. No. 4,419,467. However, such modifications, providing an increasing degree of plasticizing, result in further disadvantages such as a decrease in the wet film resistance and a deterioration in the throwing power of the coating.

SUMMARY OF INVENTION

It has now been found that binders based on epoxy resin-amine adducts can be modified to enhance the binder characteristics by incorporation of oxazolidone structures in combination with diamine bridges built up in a specific manner. Thus, the formation Of oxazolidone structures during reaction of isocyanates with epoxide compounds is known from M. E. Dyer and D. Swern, Chem. Rev. 67, 197 (1967); or J. E. Herweh and W. J. Kaufmann, Tetrahedron Letters No. 12, pages 809–812, Pergamon Press, GB (1971), and takes place in accordance with the equation;

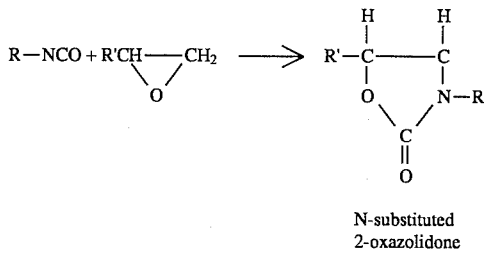

N-substituted
2-oxazolidone

As described by P. I. Kordomenos, K. C. Frisch and J. E. Kresta, J. Coatings Tech., Vol. 55, No. 700, pages 49–61 (1983), polyoxazolidones having terminal epoxide groups can also be used in combination with customary epoxy resin hardeners as coating agents. The reaction also provides for the preparation of polyoxazolidone isocyanates and corresponding prepolymers, which can be crosslinked in the customary manner. The coatings exhibit a good hardness as well as good resistance to solvents and heat.

The present invention, accordingly, relates to a process for the preparation of cationic binders, primarily for electrodeposition coatings based on modified epoxy resin-amine adducts, characterized in that;

(A) 60 to 80% by weight, preferably 65 to 75% by weight, of an epoxy resin component consisting of (Aa) 60 to 98% by weight, preferably 80 to 97% by weight, of at least one aromatic and/or aliphatic diepoxy resin having an epoxide equivalent weight of between 190 and 500, and (Ab) 2 to 40% by weight, preferably 3 to 20% by weight, of at least one epoxide compound which is modified by N-substituted mono- and/or bis-2-oxazolidone groupings, such as are obtained by reaction of glycidyl groups with isocyanate groups, and has the general formula;

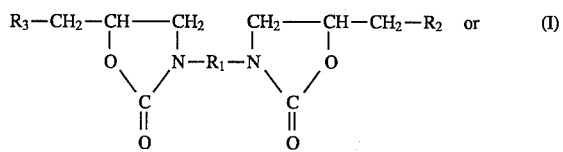 (I)

-continued

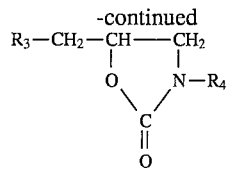

wherein
- $R_1$ represents the remaining radical or moiety of a (cyclo)aliphatic or an aromatic diisocyanate,
- $R_2$ represents the remaining radical or moiety of an aliphatic monoglycidyl ether or an aliphatic monoglycidyl ester or a radical $R_3$,
- $R_3$ represents the remaining radical or moiety of an (aromatic)-aliphatic or aromatic diglycidyl ether, and
- $R_4$ represents the remaining radical or moiety of a (cyclo)aliphatic or an aromatic monoisocyanate, are reacted with;

(B) 20 to 40% by weight, preferably 25 to 35% by weight, of an amine component consisting of;
- (Ba) 0 to 20% by amine equivalence, preferably 0 to 15% by amine equivalence, of at least one primary alkylamine and/or alkanolamine,
- (Bb) 25 to 55% by amine equivalence, preferably 35 to 50% by amine equivalence, of at least one secondary alkylamine and/or alkanolamine,
- (Bc) 20 to 50% by amine equivalence, preferably 25 to 45% by amine equivalence, of at least one primary-tertiary alkyldiamine and
- (Bd) 5 to 25% by amine equivalence, preferably 10 to 20% by amine equivalence, of a disecondary amine compound of 2 mol of a compound which is the reaction product of diprimary di- or polyamines with aliphatic monoglycidyl and/or monoepoxide compounds with one mol of a diepoxide compound, wherein the totals of the percentage figures of components A and B or components (Aa) and (Ab) or components (Ba), (Bb), (Bc) and (Bd) must in each case give 100, to provide an adduct which is free from epoxide groups and has a molecular weight of from 2000–18,000 (weight-average), a glass transition temperature of between +20° C. and +45° C., and a basicity corresponding to an amine number of at least 20 mg KOH/g, with the proviso that the epoxy resin components (Aa) and (Ab) are reacted with the amine components (Ba), (Bb), (Bc) and (Bd) at 60° C. to 80° C. in a 55–75% strength partial solution in glycol ethers, the reaction with amine component (Bc) preferably being carried out last, and that after the end of all the additions, the reaction temperature is increased to a maximum of 120° C. to bring the reaction to completion.

The invention also relates to the cationic binders for coatings prepared by the process of this invention, and to their use in combination with crosslinking components in cathodic electrodeposition coatings.

As a result of the modifications according to the present invention, on the one hand oxazolidone segments which have high glass transition temperatures, coupled with a low molecular weight, are introduced, and, on the other hand, diamine modifiers (Bd) have a high molecular weight, coupled with a low glass transition temperature. Because of this combination, the electro-dipping coatings according to the invention have excellent electrical properties, such as a high wet film resistance, coupled with a good film build-up and therefore excellent throwing power. The crosslinked films of the coatings have very good resistance properties, and, particularly, excellent corrosion protection on the edges of the workpieces.

Starting materials for the binders prepared according to the present invention which are used as component (Aa) are aromatic or aliphatic diepoxy resins, for example diepoxy resins based on diphenols or polyalkylene glycols, such as are described in the relevant literature for the preparation of epoxy resin-amine adducts which are used as cationic binders for coatings, and are available from various manufacturers. This group also includes the products modified in various ways by chain lengthening. The diepoxide compounds employed according to the invention have epoxide equivalent weights of between 190 and 500.

The epoxy resin components (Ab) are mono-or diepoxide compounds which are modified by N-substituted mono-or bis-2-oxazolidone groupings, such as are obtained by reaction of glycidyl groups with isocyanate groups, and can be defined by the following general formulae:

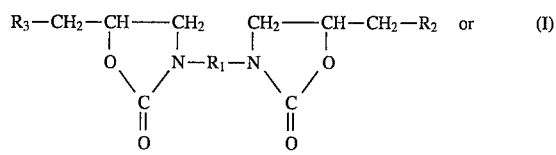

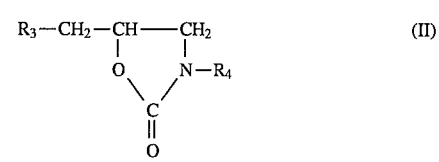

wherein
- $R_1$ represents the remaining radical or moiety of a (cyclo)aliphatic or an aromatic diisocyanate,
- $R_2$ represents the remaining radical or moiety of an aliphatic monoglycidyl ether or an aliphatic monoglycidyl ester or a radical $R_3$,
- $R_3$ represents the remaining radical or moiety of an (aromatic)-aliphatic or aromatic diglycidyl ether, and
- $R_4$ represents the remaining radical or moiety of a (cyclo)aliphatic or an aromatic monoisocyanate.

The glycidyl groups which take part in the reaction, such as are defined in the formulae (I) and (II) by the radical $R_3$, originate from diepoxide compounds. The products are essentially commercially available products of the bisphenol A or F type, aliphatic diepoxide compounds based on polyalkylene glycol, or aromatic-aliphatic diepoxide compounds, for example based on a bisphenol A modified with polyoxypropylene glycol.

The monoglycidyl compounds characterized by a radical $R_2$ in formula (I), as monofunctional compounds, as is the case with the compounds of the formula (II), are preferably employed only in combination with the corresponding difunctional compounds (formula (I), $R_2=R_3$).

Monoglycidyl compounds which are employed herein are the monoepoxide compounds having an aliphatic radical of 8 to 20 carbon atoms, such as alkyl glycidyl ethers or esters and, in particular, the known glycidyl esters of KOCH acids.

The known aliphatic, cycloaliphatic, and aromatic diisocyanates can be employed as diisocyanates of which the remaining radical is expressed in formula (I) by $R_1$. Examples are hexamethylene diisocyanate, trimethylhexamethylene diisocyanate, isophorone diisocyanate, toluylene diisocyanate (for example as a commercially available isomer mixture with an 80% content of the 2,4-isomer), diphenylmethane diisocyanate or meta-tetramethylxylylene diisocyanate.

(Cyclo)aliphatic monoisocyanates, such as octadecyl monoisocyanate, or phenyl isocyanates are employed as the monoisocyanates (radical $R_4$ in the formula (II)).

For the preparation of component (Ab), the epoxy resins are dehydrated before the reaction, for example by azeotropic distillation with an entraining agent, and are then dissolved in a solvent which is inert towards the reaction, and 0.5 to 5 mol %, based on the isocyanate groups to be reacted, of lithium bromide are added as a catalyst. The isocyanate compounds are reacted with the glycidyl compounds at reaction temperatures of 90° to 160° C. The course of the reaction is monitored by the decrease in the content of NCO-groups and the synchronous decrease in the content of oxirane groups. The resulting products have an absorption in the IR-spectrum at a wave number of 1720–1760 $cm^1$ which is typical of the carbonyl vibration of the oxazolidone grouping.

Components (Aa) and (Ab) are employed in the further reaction with the amines of component (B) in a ratio of 60 to 98% by weight, preferably 80 to 97% by weight, of component (Aa) and 2 to 40% by weight, preferably 3 to 20% by weight, of component (Ab).

Components (A) and (B) are reacted at a ratio of from 60 to 80% by weight, preferably 65 to 75% by weight, of component (A) and 20 to 40% by weight, preferably 25 to 35% by weight, of component (B) to give an adduct which is free from epoxide groups.

The amines of group (Ba) containing 0 to 20% by amine equivalence, preferably 0 to 15% by amine equivalence, of component (B), as well as the amines of group (Bb) containing 25 to 55% by amine equivalence, preferably 35 to 50% by amine equivalence, of component (B) and the amines of group (Bd) containing 5 to 25% by amine equivalence, preferably 10 to 20% by amine equivalence, of component (B) are reacted with the epoxy resin component A, consisting of (Aa) and (Ab) in a first reaction stage at 60° C. to 80° C. in a 55–75% strength partial solution in glycol ethers until the NH-functionality has been converted completely. The method of determination of the sum of basic nitrogen atoms and free oxirane groups (EPA-value) is used to monitor the course of the reaction.

The free epoxide groups which remain in this reaction step are advantageously subsequently reacted in a second reaction stage at 60° C. with the amines of group (Bc), which are present in component (B) in an amount of 20 to 50% by amine equivalence, preferably 25 to 45% by amine equivalence. The reaction is then conducted at 100°–120° C. until all the oxirane groups have been converted completely.

Amines of group (Ba) which are employed are primary alkylamines, such as n-butylamine, n-hexylamine, octylamine, mono-2-ethylhexylamine and $C_{10}$–$C_{18}$-alkylamines, fatty amines and/or primary alkanolamines, such as monoethanol-amine, 1-amino-2-propanol, 2-aminobutan-1-ol, 2-amino-2-ethylpropane-1,3-diol and 2-(2-hydroxyethoxy)-1-ethylamine.

Group (Bb) includes secondary alkylamines, such as diethylamine, di-n-propylamine, di-n-butylamine, diisopropylamine, diisobutylamine, dicyclohexylamine, di-2-ethylhexylamine and morpholine, and/or secondary alkanolamines, such as diethanolamine, diisopropanolamine, n-butylethanolamine, cyclohexylethanolamine, and 2-(N-methylamino)ethanol.

Group (Bc) includes primary-tertiary alkyldiamines, such as 1-amino-3-dimethylaminopropane (N,N-dimethylaminopropylamine), 1-amino-3-diethylaminopropane (N,N-diethylaminopropylamine), and 1-diethylamino-4-aminopentane.

The amines of group (Bd) are disecondary amine compounds which are obtained by reaction of diprimary aliphatic di- or polyamines with aliphatic monoglycidyl and/or monoepoxide compounds. These can be built up to disecondary polyaminopolyols in a further reaction in a ratio of 2 mol of amine compound to 1 mol of a diepoxide compound. Products of this type are described in detail in EP-A2-0,355,654, corresponding to U.S. Pat. No. 4,992,516. Compounds which are the reaction product of 1 mol of diethylenetriamine and 3.1 mol of ethylhexyl glycidyl ether are preferably employed for the process according to the invention.

In another preferred form, compounds which are the reaction product of 2 mol of a disecondary amine compound, consisting of 1 mol of diethylenetriamine and 3.1 mol of ethylhexyl glycidyl ether, with 1 mol of a bisphenol A-epichlorohydrin epoxy resin (epoxide equivalent weight 190) are employed.

The amines used in component (B) impart to the end product, after protonation, the required water-dilutability and in the reaction with component A lead to the molecular weight distributions characteristic of the end products, while at the same time enlarging the molecule.

The epoxy resin-amine adducts prepared according to the invention have a molecular weight of 2000 to 18,000 (weight-average) or 1500 to 3000 (number-average). Their glass transition temperature is between +20° C. and +45° C. For good solubility after protonation, a basicity corresponding to an amine number of at least 20 mg KOH/g is necessary, which should be taken into account when formulating the resin batch.

After the reaction, the organic solvent, if used, can be removed proportionately in vacuo, if desired. This process stage can be carried out only after partial neutralization of the batch and after dilution with water. In this process variant, materials which have only low contents of organic solvents and therefore also comply with strict environmental regulations, for example the low-VOC regulations of the USA, are obtained.

Amounts of acids of 20 to 45 mMol/100 g binder (solid resin) are required for the neutralization for the products prepared by the process according to the invention in order to obtain a stable and sedimentation-free aqueous solution or emulsion which is suitable for electrodeposition coating practice. The products according to the invention have excellent dispersibility because of their build-up. The processibility and the electrical properties of the binders are advantageously influenced by the low degree of neutralization.

The binders prepared by the process according to the present invention are used in combination with crosslinking components. The products which lead to crosslinking by transesterification reactions are described, for example, in EP-B1-0,012,463, corresponding to U.S. Pat. No. 4,332,711; DE-A1-3,315,469; Austrian Pat. No. 372,099, corresponding to U.S. Pat. No. 4,458,054; and Austrian Pat. No. 379,602, corresponding to U.S. Pat. No. 4,523,007, can be used in the present invention. Crosslinking by blocked isocyanates or amino resins, if appropriate, using corresponding catalysts, can also be used. The stoving temperatures for the deposited films are between 140° C. and 190° C., depending on the hardening system employed.

The preparation of the bath material for the electrodeposition coating, the pigmentation and the neutralization and dilution of the coatings are known to a person skilled in the art and do not require more detailed description. This also applies to the coating operation and the hardening of the films deposited.

DETAILED DESCRIPTION AND PRESENTLY PREFERRED EMBODIMENTS

The following examples illustrate the invention without limiting it in its scope. All the data in parts or percentages relate to weight units, unless otherwise stated.

The following abbreviations are used in the examples:

| | |
|---|---|
| MP | methoxypropanol |
| EP | ethoxypropanol |
| CE | versatic acid glycidyl ester Cardura ® E (Shell) |
| EEW 475 | epoxy resin based on bisphenol A-diglycidyl ether having an epoxy resin equivalent weight of 475 (Epikote ® 1001, Shell), 75% strength in MP |
| EEW 190 | epoxy resin based on bisphenol A-diglycidyl ether having an epoxide equivalent weight of 190 (Epon ® 828, Shell) |
| EEW 200 | epoxy resin based on a diglycidyl ether which is modified with polyoxypropylene glycol and having an epoxide equivalent weight of 200 (DER ® 732, Dow Chemical) |
| EEW 320 | epoxy resin based on a diglycidyl ether which is modified with polyoxypropylene glycol and has an epoxide equivalent weight of 320 (DER ® 736, Dow Chemical) |
| EEW 350 | epoxy resin based on bisphenol A-diglycidyl ether which is modified with polyoxypropyl glycol and has an epoxide equivalent weight of 350 (BPP 350 ®, Sanyo Chemical) |
| TDI | toluylene diisocyanate 80/20 (commercially available isomer mixture) |
| IPDI | isophorone diisocyanate |
| MDI | diphenylmethane diisocyanate |
| HMDI | hexamethylene diisocyanate |
| TMHMDI | trimethylhexamethylene diisocyanate |
| TT | dimeric toluylene diisocyanate (Bayer) |
| ODI | octadecyl monoisocyanate |
| MEHA | mono-2-ethylhexylamine |
| DOLA | diethanolamine |
| DMAPA | N,N-dimethylaminopropylamine |
| DEAPA | N,N-diethylaminopropylamine |

The following methods are used in the examples for the determination of the NCO-content or the oxirane content (EPA-Value):

NCO-Value: About 0.5–4 g of resin, corresponding to the NCO-value to be expected, are dissolved in 30 ml of diglycol dimethyl ether, 10 ml of Kappelmeyer's reagent are added, and the mixture is homogenized for one minute. After addition of three drops of bromophenol blue indicator solution, the mixture is titrated from blue to yellow using 0.5 N aqueous HCl (value A). A blank value is carried out in parallel, including all the reagents except for the amount of resin weighed out (value B).

$$\text{NCO-Value (\%)} = \frac{B - A}{\text{amount weighed out (g)}} \times 2.1$$

Kappelmeyer's reagent: 64.6 g pure diisobutylamine
864 g diglycol dimethyl ether Calculation of the amount of resin weighted out in grams based on expected NCO – value:

0.5–1.0 g . . . if . . . 10–15%
2–4 g . . . if . . . below 1%

EPA-Value: Method for determination of the content of oxirane groups. Any amino groups present are also determined in milliequivalents per gram of sample by this method.

0.2–0.4 g of resin are accurately weighed (to the milligram) and are fused in five drops of methoxypropanol. After cooling, 25 ml of a mixture of methylene chloride and glacial acetic acid (4:1 parts by volume) are added and the resin is dissolved, while heating gently. 0.5 g of tetrabutylammonium iodide and three drops of crystal violet solution are then added at room temperature. The mixture is titrated from blue-violet to grass-green (no blue tint) using 0.1N perchloric acid solution in glacial acetic acid.

A blank value (without resin) is determined in the same manner.

$$\text{EPA-Value} = \frac{(A - B) \times 0.1 \times F}{\text{amount weighed out (g)}}$$

A=ml of 0.1N perchloric acid for the sample
B=ml of 0.1N perchloric acid for the blank value
F=0.1N perchloric acid solution factor

Determination of 0.1N Perchloric Acid Factor (F)

About 200 mg of potassium hydrogen phthalate (analytical grade) are accurately weighed to 0.1 mg into a conical flask. After addition of 30 ml of glacial acetic acid and three drops of crystal violet solution, titration is carried out from blue-violet to grass-green using the approximately 0.1N perchloric acid solution.

$$F = \frac{\text{amount of potassium hydrogen phthalate weighed out}}{\text{consumption} \times 20.422}$$

The epoxide equivalent weight (EEW) in grams of solid resin, that is to say the amount of reaction product (in grams of solid resin) which contains one epoxide group, is calculated as follows from the EPA-value:

$$\frac{\text{Epoxide equivalent weight}}{\text{(grams of solid resin)}} = \frac{\text{solids content} \times 10}{\text{EPA}}$$

Preparation of Epoxy Resin Component (Ab) Employed According to Invention

Before reaction with the isocyanate component, the epoxide compounds employed are freed from traces of water by azeotropic distillation, preferably using xylene or toluene as the entraining agent. The entraining agent is then removed by vacuum distillation, and the epoxide compound is diluted with the amount of diglycol dimethyl ether needed to achieve the reaction dilution. This solution to which the stated amount of catalyst has been added is heated to the reaction temperature, while stirring. The isocyanate component is added in the course of two hours, and the reaction is carried out at the stated temperature until complete conversion of the isocyanate group is achieved; that is to say, to an NCO-content of less than 0.1%. The starting substances, reaction conditions, and characteristics of the intermediate products are summarized in Table 1 as follows.

TABLE 1

| Component | Parts by weight (mol) of Isocyanate | Parts by weight (mol) of Epoxide | Mol % Li Br | Reaction Temperature | Reaction Time | Solution (% Strength) in DGDME | Epoxide Equivalent | Solid Resin Content(%) |
|---|---|---|---|---|---|---|---|---|
| (Ab)1 | 174 (1.0) TDI | 760 (2.0) EEW 190 | 2.5 | 110° C. | 4 | 80 | 450 ± 20 | 70 |
| (Ab)2 | 222 (1.0) IPDI | 1280 (2.0) EEW 320 | 5.0 | 160° C. | 6 | 80 | 780 ± 20 | 80 |
| (Ab)3 | 254 (1.0) MDI | 1400 (2.0) EEW 350 | 1.0 | 110° C. | 4 | 70 | 830 ± 30 | 60 |
| (Ab)4 | 168 (1.0) HMDI | 760 (2.0) EEW 190 | 3.0 | 130° C. | 6 | 65 | 460 ± 20 | 60 |
| (Ab)5 | 210 (1.0) TMHMDI | 1400 (2.0) EEW 350 | 5.0 | 160° C. | 10 | 65 | 800 ± 30 | 60 |
| (Ab)6 | 348 (1.0) TT | 760 (2.0) EEW 190 | 1.0 | 160° C. | 6 | 60 | 730 ± 40 | 60 |
| (Ab)7 | 174 (1.0) TDI | 250 (1.0) CE 400 (1.0) EEW 200 | 2.5 | 160° C. | 10 | 80 | 410 ± 20 | 70 |
| (Ab)8 | 174 (1.0) TDI | 1400 (2.0) EEW 350 | 2.5 | 130° C. | 6 | 80 | 790 ± 30 | 80 |
| (Ab)9 | 295 (1.0) ODI | 380 (1.0) EEW 190 | 5.0 | 160° C. | 4 | 70 | 690 ± 30 | 70 |

Preparation of Component (Bd) Employed According to Invention

Component (Bd) 1: 577 g (3.1 mol) of 2-ethylhexyl glycidyl ether are added to a solution of 103 g (1 mol) of diethylenetriamine and 170 g of methoxypropanol at 60° C. in the course of two hours, and the components are reacted to an EPA-value of 3.70 and a refractive index n20/d of 1.4600. A mixture of 190 g (1 epoxide equivalent) of a bisphenol A-epichlorohydrin epoxy resin (EEW 190) and 49 g of methoxypropanol is then added at 60° C. in the course of two hours. The reaction is continued to an EPA-value of 2.70 and a refractive index of 1.4790. A solution of 100 g of the 80% strength reaction product and 30 g of methoxypropanol has a viscosity (DIN 53211/20° C.) of 60–80 seconds.

Component (Bd) 2: 577 g (3.1 mol) of 2-ethylhexyl glycidyl ether are added to 103 g (1 mol) of diethylenetriamine and 170 g of methoxypropanol at 60° C. in the course of two hours, and the components are reacted at this temperature to an EPA-value of 3.53. A solution of the 80% strength resin has a refractive index of n20/d of 1.4580.

Examples 1 to 9

The binders of this invention are prepared in the following manner in accordance with the data summarized in Table 2. In a first reaction stage, the epoxy resin components (Aa) and (Ab) are dissolved in methoxypropanol or ethoxypropanol in a suitable reaction vessel and are reacted with the amine components (Ba), (Bb) and (Bd) at 60° C. until the stated EPA-value 1 is reached.

The product is then reacted with the amine component (Bc), also at 60° C., and after increasing the temperature to 120° C., the reaction is ended when the stated EPA-value 2 is reached.

Table 2 is as follows:

TABLE 2

| Example Component | 1 (X) | 2 (X) | 3 (X) |
|---|---|---|---|
| (Aa) | | | |
| EEW 475 (75%) | 601.3 (0.95) | 443 (0.7) | 697 (1.1) |
| EEW 350 | — | 525 (1.5) | — |
| EEW 190 | — | 285 (1.5) | 570 (3.0) |
| (Ab) | 129 (0.20) | 683 (0.70) | 415 (0.3) |
|  | (Ab)1(70%) | (Ab)2(80%) | (Ab)3(60%) |
| (Ba) | — | 32.3 (0.5) | 32.3 (0.5) |
|  |  | MEHA | MEHA |
| (Bb) | 45.2 (0.43) | 189 (1.8) | 147 (1.4) |
|  | DOLA | DOLA | DOLA |
| (Bd) | 119 (0.28) | 652 (0.6) | 652 (0.6) |
|  | (Bd)2(80%) | (Bd)1(80%) | (Bd)1(80%) |
| Solvent | 140.2 MP | 974 MP | 960 MP |
| *EPA-Value 1 | 1.30 | 1.42 | 1.54 |
| (Bc) | 16.3 (0.32) | 78 (1.2) | 104 (1.6) |
|  | DMAPA | DEAPA | DEAPA |
| **EPA-Value 2 | 1.14 | 1.30 | 1.41 |
| Parameters: | | | |
| Solids Content, % | 65 | 65 | 60 |
| Viscosity Measurement DIN 53211/ Solution (XX) 20° C. | 100 + 50 MP | 100 + 40 MP | 110 + 30 MP |
| Flow Time | 230 s | 80 s | 250 s |
| ***GPC, Ultrastyragel | | | |
| Weight-Average Mw | 8976 | 2508 | 9974 |
| Number-Average Mn | 2295 | 1542 | 2586 |

| Example Component | 4 (X) | 5 (X) | 6 (X) |
|---|---|---|---|
| (Aa) | | | |
| EEW 475 (75%) | 570 (0.9) | 1824 (2.88) | 2150 (3.39) |
| EEW 350 | — | — | 147 (0.42) |
| EEW 190 | 570 (3.0) | 315 (1.66) | — |
| (Ab) | 383 (0.5) | 253 (0.19) | 110 (0.09) |
|  | (Ab)4(60%) | (Ab)5(60%) | (Ab)6(60%) |
| (Ba) | 48.4 (0.75) | 53.5 (0.415) | — |
|  | MEHA | MEHA |  |
| (Bb) | 126 (1.2) | 189 (1.8) | 158 (1.5) |
|  | DOLA | DOLA | DOLA |
| (Bd) | 380 (0.35) | 652 (0.6) | 652 (0.6) |
|  | (Bd)1(80%) | (Bd)1(80%) | (Bd)1(80%) |
| Solvent | 410 MP | 460 MP | 1023 EP |

TABLE 2-continued

| | | | |
|---|---|---|---|
| *EPA-Value 1 | 1.90 | 1.52 | 1.20 |
| (Bc) | 117 (1.8) | 78 (1.2) | 97.5 (1.5) |
| | DEAPA | DEAPA | DEAPA |
| **EPA-Value 2 | 1.70 | 1.30 | 1.11 |
| Parameters: | | | |
| Solids Content, % | 70 | 70 | 60 |
| Viscosity | 93 + 47 MP | 81 + 59 EP | 95 + 45 EP |
| Measurement DIN 53211/ Solution (XX) 20° C. | | | |
| Flow Time | 130 s | 110 s | 145 s |
| ***GPC, Ultrastyragel | | | |
| Weight-Average Mw | 5624 | 5419 | 6873 |
| Number-Average Mn | 1571 | 1776 | 2049 |

| Example Component | 7 (X) | 8 (X) | 9 (X) |
|---|---|---|---|
| (Aa) | | | |
| EEW 475 (75%) | 443 (0.7) | 1892 (2.99) | 1963 (3.1) |
| EEW 350 | 525 (1.5) | 291 (0.83) | — |
| EEW 190 | 285 (1.5) | — | — |
| (Ab) | 410 (0.7) | 178 (0.18) | 394 (0.4) |
| | (Ab)7(70%) | (Ab)8(80%) | (Ab)9(70%) |
| (Ba) | 38.7 (0.6) | — | — |
| | MEHA | | |
| (Bb) | 210 (2.0) | 168 (1.6) | 116 (1.1) |
| | DOLA | DOLA | DOLA |
| (Bd) | 326 (0.3) | 761 (0.7) | 652 (0.6) |
| | (Bd)1(80%) | (Bd)1(80%) | (Bd)1(80%) |
| Solvent | 788 EP | 1139 EP | 613 EP |
| *EPA-Value 1 | 1.85 | 1.15 | 1.26 |
| (Bc) | 78 (1.2) | 104 (1.6) | 117 (1.8) |
| | DEAPA | DEAPA | DEAPA |
| **EPA-Value 2 | 1.32 | 1.13 | 1.24 |
| Parameters: | | | |
| Solids Content, % | 65 | 60 | 65 |
| Viscosity | 108 + 32 MP | 95 + 45 EP | 90 + 60 EP |
| Measurement DIN 53211/ Solution (XX) 20° C. | | | |
| Flow Time | 95 s | 100 s | 122 s |
| ***GPC, Ultrastyragel | | | |
| Weight-Average Mw | 3768 | 5811 | 10205 |
| Number-Average Mn | 1645 | 1824 | 2309 |

The resulting reaction products are characterized by their solid resin content, the viscosity, and the molecular weight distribution as determined by gel permeation chromatography (GPC).
(X) . . . amounts stated in parts by weight, the equivalents of oxirane or NH-groups which react during the synthesis are stated in parentheses.
(XX) . . . the composition of the measurement solution is stated as (grams of resin solution + grams of solvent).
* . . . EPA-Value 1: milliequivalents of oxirane groups and basic nitrogen groups per gram of resin solution.
** . . . EPA-Value 2: milliequivalents of basic nitrogen groups per gram of resin solution:

amine number in mg KOH/g = $\dfrac{\text{EPA-Value 2} \times 560}{\text{solids content in \%}}$

*** . . . the gel permeation analysis was carried out using tetrahydrofuran as the eluting agent on a unit consisting of an LKB-pump 2150, 3 Ultrastyragel columns (Waters) with an exclusive volume of 500, 1000, and 10,000 Å and a differential refractometer 12401 (Waters), in comparison with a polystyrene calibration standard.

Crosslinking Component VK 1—In a reaction vessel with equipment suitable for the azeotropic process and a bubble tray column for removal of the alcohol component formed during the partial transesterification, 29.7 g (0.9 mol) of 91% pure paraformaldehyde are added in portions to a mixture of 160 g (1 mol) of diethyl malonate, 0.34 g (0.004 mol) of piperidine and 0.22 g (0.004 mol) of 85% strength formic acid at 80° C. such that a temperature of 95° C. is not exceeded when the exothermic reaction starts. The reaction mixture is stirred at 95° C. until the paraformaldehyde has dissolved completely. The temperature is increased to 110° C. in the course of two hours. When the temperature reaches 110° C., a total of 9 g of water are distilled off together with special grade petroleum (boiling range 80° C.–120° C.) as the entraining agent. The entraining agent employed is subsequently removed by applying a vacuum.

After addition of 22.8 g (0.3 mol) of propylene 1,2-glycol, the batch is heated up to the start of distillation (140° C.–150° C.). As the temperature rises, 27 parts (0.6 mol) of ethanol are distilled off. The resulting product has a solid resin content (120° C., 30 minutes) of about 92%, an OH number of less than 5 mg KOH/g, an intrinsic viscosity number of about 5.2 ml/g (20° C., dimethylformamide) and a refractive index n20/d of 1.4670.

Crosslinking Component VK 2—In accordance with the process described for VK 1, a mixture of 134.4 g (0.84 mol) of diethyl malonate, 0.286 g (0.0034 mol) of piperidine and 0.185 g (0.0034 mol) of 85% strength formic acid is reacted with 13.86 g (0.42 mol) of 91% pure paraformaldehyde, a total of 9.24 g (0.51 mol) of water being distilled off. The product has a solids content of 78% (120° C., 30 minutes). The refractive index has a value of n20/d=1.437.

134 g (1 mol) of trimethylolpropane are then added and the mixture is heated up to the start of distillation (140°–150° C.). As the temperature rises, 23 g (0.5 mol) of ethanol are distilled off. When the stated amount of distillate is obtained, the mixture is diluted with 263 g of diethylene glycol dimethyl ether (DGDME) and cooled to 30° C. 800 g (2.5 mol or NCO-equivalents) of a reaction product of 2.5 mol of toluylene diisocyanate (commercially available isomer mixture) and 2.5 mol of ethylene glycol monohexylether are added at 30° C. in the course of six hours. The temperature is increase to 100° C. in the course of a further four hours, and the reaction is carried out at this temperature up to an NCO-content of less that 0.01 milliequivalent per gram of sample.

The resulting product having a solid resin content of 80% (120° C., 30 minutes) has a refractive index n20/d of 1.507 and a viscosity (10 g of resin solution +4 g of DGDME) of E—F (Gardner-Holdt).

Crosslinking Component VK 3—Reaction product of 134 g (1 mol) of trimethylolpropane with 851 g (2.8 mol) of a TDI, halfblocked with 2-ethylhexanol, in a 70% strength DGDME solution.

Comparison Example 1 (Product According to EP-A2—0,355,654)

772 g of MOD 3[*)] (corresponding to 0.6 NH-equivalents), 570 g (3.0 epoxide equivalents) of a bisphenol A diepoxy resin (EEW 190), 77.4 g (1.2 NH-equivalents) of 2-ethylhexylamine and 162 g of methoxypropanol are reacted in a suitable reaction vessel at 60° C. in a first reaction stage until conversion of the NH-functionality is complete, determined by reaching an EPA-value of 1.99. 1330 g (2.1 epoxide equivalents) of a 75% strength solution of a bisphenol A diepoxy resin (EEW 475) in methoxypropanol and 189 g (1.8 NH-equivalents) of diethanolamine are then added, and the mixture is reacted again until the NH-functionality is converted, determined by reaching an EPA-value of 1.63. The remaining oxirane groups are reacted in a third reaction stage with 78 g (1.2 NH-equivalents) of N,N-diethylaminopropylamine at 60° C. for two hours, at 90° C. for a further hour, and at 120° C. for a further three hours, to an EPA-value of 1.49; and the product is diluted with methoxypropanol to a solid resin content of 65% by weight. The viscosity (DIN 53211/20° C.) of a resin solution diluted to a solid resin content of 46% by weight with methoxypropanol is 160 seconds. The weight and number averages determined from gel chromatograms are: Mw=8452, Mn=1431.

*⁾ MOD 3: 577 g (3.1 mol) of 2-ethylhexyl glycidyl ether are added to 103 g (1 mol) of diethylenetriamine and 170 g of methoxypropanol at 60° C. in the course of two hours, and the components are reacted at this temperature to an EPA-value of 3.53. A mixture of 87 g of methoxypropanol and 350 g (1 epoxide equivalent) of a diepoxy resin based on bisphenol A which is modified with polyoxypropylene glycol (BPP 350, Sanyo Chemical) is then added at 60° C. in the course of two hours, and the reaction is continued to an EPA-value of 2.33.

A solution of 100 g of the 80% strength resin and 30 g of methoxypropanol has a viscosity (DIN 53211/20° C.) of 60–70 seconds.

80 parts by weight (solid resin) of the product described as Comparison Example 1 are homogenized with 20 parts by weight (solid resin) of the Crosslinking Component VK 2 at 60° C. for 30 minutes and, after neutralization with 35 mMol of formic acid per 100 g of solid resin, the mixture is further processed to a coating in the manner described.

Comparison Example 2 (Product According to Austrian Pat. No. 381,115)

1627 g (3.43 equivalents) of epoxy resin EEW 475 are reacted with 226 g (0.24 equivalent) of carboxy-functional modifier[1] in the presence of the solvent methoxypropanol at a solid resin content of 85% in a suitable reaction vessel at 110° C. to an acid number of less than 0.5 mg KOH/g. After dilution of the batch to a solids content of 70% with further solvent, 94.5 g (0.9 NH-equivalents) of diethanolamine, 67.5 g (0.9 NH-equivalents) of N-methylethanolamine and 78 g (1.2 NH-equivalents) of N,N-diethylaminopropylamine are added at 60° C. in the course of two hours. The components are then reacted at 90° C. for four hours, 238 g (1.19 equivalents) of epoxy resin EEW 200 are added and the components are reacted at 120° C. for six hours, until all the glycidyl groups have been consumed. The reaction product is diluted to a solids content of 65% with MP.

For Comparison Example 2, 70 parts (solid resin) of the reaction product are reacted with 30 parts (solid resin) of Crosslinking Component VK 1 at 120° C. for one hour.

After neutralization with 40 mMol of formic acid per 100 g of solid resin, a coating is prepared in the manner described.

[1] Carboxy-functional modifier: Polyester of 3 mol of trimethylolpropane, 2 mol of adipic acid, 1 mol of isononanoic acid, and 1 mol of tetrahydrophthalic anhydride (acid number: 65 mg KOH/g, carboxyl equivalent weight 942 g).

Comparison Example 3 (Product According to EP-A2-0, 218,812)

228 parts of bisphenol A (1 mol) are reacted with 260 parts of diethylaminopropylamine (2 mol) and 66 parts of 91% pure paraformaldehyde (2 mol) in the presence of 131 parts of toluene, as the azeotrope entraining agent, at 90° to 130° C. in a suitable reaction vessel until 42 parts of water of reaction have been separated off. After addition of 152 parts of diethylene glycol dimethyl ether and cooling to 30° C., 608 parts (2.0 mol) of a toluylene diisocyanate halfblocked with 2-ethylhexanol are added in the course of 45 minutes.

As soon as all the isocyanate groups have been consumed, 500 parts (2 mol) of the glycidyl ester of a saturated tertiary $C_9$–$C_{11}$-monocarboxylic acid which has been dissolved in 300 parts of diethylene glycol dimethyl ether are added to 1400 parts of this solution, and the components are reacted at 95° C. to 100° C. to an epoxide value of zero. After cooling to 80° C., 210 parts (1 mol) of trimethylhexamethylene diisocyanate, dissolved in 53 parts of diethylene glycol dimethyl ether, are added in the course of 30 minutes. After checking that the reaction is complete, 0.6 part/100 g of solid resin of dibutyltin dilaurate (calculated as the metal) is added to the product and the product is converted into the water-dilutable form by addition of 35 millimol of formic acid/100 g of solid resin.

Testing of Products According to Examples 1–9 In Coatings Which Can Be Deposited Cathodically The products prepared according to the invention are subjected to precondensation in the ratios stated in Table 3 with a crosslinking component, as above defined, in 60% strength solution in methoxypropanol or ethoxypropanol in accordance with the conditions stated. Coatings are prepared in the customary manner from these binder solutions in accordance with the formulation;

100 . . . parts of binder (solid resin)

36.5 . . . parts of titanium dioxide

3 . . . parts of lead silicate pigment 0.5 . . . part of carbon black and, after protonation with the amount of acid stated in Table 3, are diluted to a solids content of 18% with deionized water. Table 3 is as follows:

TABLE 3

| Binder Combination | Crosslinking Component VK (Parts Solid Resin) | Parts Solid Resin From Example | Reaction Conditions of Base Resin/VK | Neutralization Agent Requirement in mM Formic Acid per 100 g Solid Resin |
|---|---|---|---|---|
| 1 | 20 parts of VK 1 | 80 parts of Ex. 1 | 1 h 110° C. | 35 |
| 2 | 30 parts of VK 2 | 70 parts of Ex. 2 | 1 h 120° C. | 35 |
| 3 | 30 parts of VK 2 | 70 parts of Ex. 3 | 1 h 60° C. | 40 |
| 4 | 25 parts of VK 1 | 75 parts of Ex. 4 | 2 h 110° C. | 35 |
| 5 | 25 parts of VK 1 | 75 parts of Ex. 5 | 2 h 100° C. | 35 |
| 6 | 20 parts of VK 1 | 80 parts of Ex. 6 | 1 h 60° C. | 40 |
| 7 | 25 parts of VK 2 | 75 parts of Ex. 7 | 1 h 60° C. | 45 |
| 8 | 30 parts of VK 2 | 70 parts of Ex. 8 | 1 h 90° C. | 40 |

TABLE 3-continued

| Binder Combination | Crosslinking Component VK (Parts Solid Resin) | Parts Solid Resin From Example | Reaction Conditions of Base Resin/VK | Neutralization Agent Requirement in mM Formic Acid per 100 g Solid Resin |
|---|---|---|---|---|
| 9 | 20 parts of VK 2 | 80 parts of Ex. 9 | 2 h 120° C. | 45 |
| 10 | 25 parts of VK 3 | 75 parts of Ex. 3 | 1 h 60° C. | 45 |
| 11 | 30 parts of VK 3 | 70 parts of Ex. 6 | 1 h 60° C. | 40 |

Lead in the form of lead octoate was employed in an amount of 1 part of lead (metal) per 100 parts of binder solid resin as the catalyst for the hardening.

For Comparison Example 3, tin in the form of dibutyltin dilaurate was employed in an amount of 0.6 part/100 g of solid resin (calculated as the metal).

The coating is deposited onto zinc-phosphated steel sheets at a bath temperature of 28° C. over a coating time of two minutes. The sheets coated in this way were then stoved at 160° C. for 30 minutes. The test results are summarized in Table 4 as follows:

TABLE 4

| Coating from Binder | Deposition Voltage | Layer Thickness μm | Depth of Roughness $Ra^{(1)}$ in Micrometers | Salt Spray ASTM-B-117-64 in hours[2] | Edge Evaluation After 960 Hours Salt Spray Test[3] |
|---|---|---|---|---|---|
| 1 | 390 | 15 | 0.35 | 1000 | 0 |
| 2 | 300 | 28 | 0.28 | 960 | 1 |
| 3 | 330 | 26 | 0.20 | 1000 | 0 |
| 4 | 300 | 29 | 0.30 | 960 | 0 |
| 5 | 300 | 22 | 0.28 | 1000 | 0 |
| 6 | 360 | 17 | 0.35 | 1000 | 0 |
| 7 | 300 | 32 | 0.23 | 960 | 1 |
| 8 | 390 | 20 | 0.22 | 1000 | 0 |
| 9 | 300 | 29 | 0.20 | 960 | 1 |
| 10 | 300 | 28 | 0.22 | 1000 | 0 |
| 11 | 390 | 22 | 0.24 | 1000 | 0 |
| Comparison Example 1 | 360 | 30 | 0.30 | 1000 | 2 |
| Comparison Example 2 | 330 | 26 | 0.29 | 960 | 2–3 |
| Comparison Example 3 | 330 | 16 | 0.37 | 1000 | 0–1 |

[1] The roughness values were measured with the "Surftest 201" apparatus from Mitutoyo.
[2] Up to the number of hours stated, the attack on the cross-incision is less than 2 mm.
[3] For evaluation of the edge corrosion, the samples were evaluated according to the following scale of ratings:
0 = no attack
1 = isolated blisters detectable
2 = significant corrosive attack along the edge
3 = severe blistering over the entire edge length The test results of the products according to the present invention in respect to corrosion protection on the edges are particularly significant in direct comparison with the properties of comparison products from patent applications EP-A2-0,355,654, corresponding to U.S. Pat. No. 4,992,516; Austrian Patent No. 381,115, and EP-A2-0,218,812, corresponding to U.S. Pat. No. 4,845,171; which are considered to be very good and which are built up in a similar manner but without oxazolidone structural units.

As will be apparent to one skilled in the art, various modifications can be made within the scope of the aforesaid description. Such modifications being within the ability of one skilled in the art form a part of the present invention and are embraced by the appended claims.

It is claimed:

1. Process for the preparation of cationic binders based on modified epoxy resin-amine adducts comprising reacting;
(A) 60 to 80% by weight of an epoxy resin component consisting of
  (Aa) 60 to 98% by weight of at least one aromatic and/or aliphatic diepoxy resin having an epoxide equivalent weight of between 190 and 500, and
  (Ab) 2 to 40% by weight of at least one epoxide compound which is modified by N-substituted mono- and/or bis-2-oxazolidone groupings, which are obtained by reaction of glycidyl groups with isocyanate groups, and having the general formula;

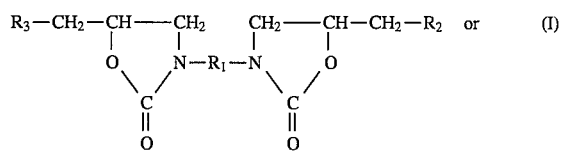

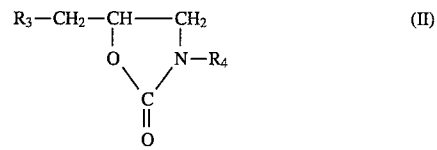

wherein $R_1$ represents the moiety of a (cyclo)aliphatic or an aromatic diisocyanate, $R_2$ represents the moiety of an aliphatic monoglycidyl ether or an aliphatic monoglycidyl ester or a radical $R_3$, $R_3$ represents the moiety of an (aromatic)-aliphatic or aromatic diglycidyl ether, and $R_4$ represents the moiety of a (cyclo)aliphatic or an aromatic monoisocyanate, with (B) 20 to 40% by weight of an amine component consisting of (Ba) 0 to 20% by amine equivalence of at least one primary alkylamine and/or alkanolamine, (Bb) 25 to 55% by amine equivalence of at least one secondary alkylamine and/or alkanolamine, (Bc) 20 to 50% by amine equivalence of at least one primary-tertiary alkyldiamine, and (Bd) 5 to 25% by amine equivalence of a disecondary amine compound of 2 mol of a compound resulting from the reaction product of diprimary di- or polyamines with aliphatic monoglycidyl and/or monoepoxide compounds with one mol of a diepoxide compound, wherein the totals of the percentage figures of components A and B equals 100 to give an adduct which is free from epoxide groups and has a molecular weight of from about 2000–18,000 (weight-average), a glass transition temperature of between +20° C. and +45° C., and a basicity corresponding to an amine number of at least 20 mg KOH/g, with the proviso that the epoxy resin components (Aa) and (Ab) of component A are reacted with the amine components (Ba), (Bb), (Bc) and (Bd) of component B at 60° C. to 80° C. in a 55–75% strength partial solution in glycol ethers, and that after the end of all the additions, the reaction temperature is increased to a maximum of 120° C. to bring the reaction to completion.

2. The process of claim 1 wherein the resin-amine adduct contains 65 to 75% by weight of the epoxy resin component (A) and 25 to 35% by weight of the amine component (B), and wherein in component (A) (Aa) is present in an amount of from 80 to 97% by weight and (Ab) is present in an amount of from 3 to 20% by weight; and wherein in component B (Ba) is present in an amount of from 0 to 15% by amine equivalence, (Bb) is present in an amount of from 35 to 50% by amine equivalence, (Bc) is present in an amount of from 25 to 40% by amine equivalence, and (Bd) is present in an amount of from 10 to 20% by amine equivalence.

3. The process of claim 2 wherein the reaction with amine component (Bc) is carried out after reaction with amine components (Ba) and (Bb).

4. The cationic binders of claim 1.

5. The cationic binders of claim 2.

6. The cationic binders of claim 3.

7. The cationic binders of claim 4 in combination with crosslinking components in cathodic electrodeposition coatings.

8. The cationic binders of claim 5 in combination with crosslinking components in cathodic electrodeposition coatings.

9. The cationic binders of claim 6 in combination with crosslinking components in cathodic electrodeposition coatings.

* * * * *